(12) United States Patent
Varnoux et al.

(10) Patent No.: US 9,677,614 B2
(45) Date of Patent: Jun. 13, 2017

(54) CAGE FOR A ROLLING BEARING, NOTABLY FOR A MOTOR VEHICLE ELECTRIC POWER STEERING BEARING

(71) Applicant: AKTIEBOLAGET SKF, Gothenburg (SE)

(72) Inventors: Laurent Varnoux, Saint-avertin (FR); Thierry Adane, Tours (FR); Thomas Perrotin, Saint Roch (FR)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/763,288

(22) PCT Filed: Jan. 23, 2014

(86) PCT No.: PCT/EP2014/051284
§ 371 (c)(1),
(2) Date: Jul. 24, 2015

(87) PCT Pub. No.: WO2014/114693
PCT Pub. Date: Jul. 31, 2014

(65) Prior Publication Data
US 2016/0003297 A1    Jan. 7, 2016

(30) Foreign Application Priority Data
Jan. 25, 2013 (FR) ...................... 13 50659

(51) Int. Cl.
*F16C 33/41* (2006.01)
*F16C 43/06* (2006.01)
*F16C 33/38* (2006.01)

(52) U.S. Cl.
CPC ........ *F16C 33/418* (2013.01); *F16C 33/3812* (2013.01); *F16C 33/3887* (2013.01);
(Continued)

(58) Field of Classification Search
CPC   F16C 33/8812; F16C 33/3887; F16C 33/414; F16C 33/416; F16C 33/418;
(Continued)

(56) References Cited

U.S. PATENT DOCUMENTS 2,146,440 A  *  2/1939  Pew ..................... F16C 19/08
                                                              29/441.1
4,004,840 A  *  1/1977  Johnston ............. B60B 27/0005
                                                              384/526

(Continued)

FOREIGN PATENT DOCUMENTS

CN          102537033 A     7/2012
DE            3526627 A1    2/1987
(Continued)

*Primary Examiner* — Marcus Charles
(74) *Attorney, Agent, or Firm* — Bryan Peckjian; SKF USA Inc. Patent Dept.

(57) ABSTRACT

A cage for a rolling bearing, wherein the cage is intended to ensure the circumferential spacing of a row of rolling elements. The cage comprises pockets for the rolling elements and connecting tabs. Each connecting tab connects two successive pockets. At least one recess is formed in a thickness of at least one of the tabs.

12 Claims, 4 Drawing Sheets

(52) U.S. Cl.
CPC .......... *F16C 33/414* (2013.01); *F16C 33/416* (2013.01); *F16C 43/06* (2013.01)

(58) Field of Classification Search
CPC .... F16C 33/467; F16C 33/6629; F16C 43/06; F16C 2326/24; B62D 1/16; B62D 5/0409
USPC ........ 384/470, 523, 526–527, 531, 533–534, 384/572; 74/492
See application file for complete search history.

(56) References Cited

U.S. PATENT DOCUMENTS

| | | | | |
|---|---|---|---|---|
| 4,278,307 A | * | 7/1981 | Olschewski | ............ F16C 43/08 384/526 |
| 4,938,613 A | * | 7/1990 | Griffin | ................. F16C 33/416 384/526 |
| 5,082,375 A | * | 1/1992 | Hillmann | ................ F16C 29/04 384/526 |
| 5,291,655 A | * | 3/1994 | Benson | ................. B21D 53/10 29/898.044 |
| 5,499,452 A | * | 3/1996 | Godec | ................... B21D 53/12 29/439 |
| 6,843,604 B2 | * | 1/2005 | Hiramatsu | ........... F16C 19/163 384/450 |
| 6,890,105 B2 | * | 5/2005 | Ide | ....................... F16C 33/416 384/470 |
| 7,044,645 B2 | * | 5/2006 | Yamamoto | ........... F16C 33/418 384/523 |
| 7,198,408 B2 | * | 4/2007 | Yamamoto | ........... F16C 33/416 384/531 |
| 2002/0037123 A1 | * | 3/2002 | Kobayashi | ........... F16C 19/166 384/513 |
| 2008/0187261 A1 | * | 8/2008 | Tanaka | ................. F16C 33/416 384/470 |
| 2011/0221201 A1 | | 9/2011 | Nies | |
| 2011/0229312 A1 | * | 9/2011 | Frank | ................. F16C 33/3806 415/170.1 |
| 2012/0210819 A1 | * | 8/2012 | Delos | ...................... B62D 1/16 74/492 |
| 2014/0016889 A1 | * | 1/2014 | Adane | ................ F16C 33/3887 384/513 |
| 2014/0054102 A1 | * | 2/2014 | Adane | ................ F16C 33/3887 180/443 |

FOREIGN PATENT DOCUMENTS

| | | | | |
|---|---|---|---|---|
| DE | 102006015547 A1 | * | 1/2006 | ............. F16C 33/38 |
| DE | 102005055237 A1 | * | 5/2007 | ............. B21D 39/04 |
| DE | 102008038534 A1 | | 2/2010 | |
| DE | 102008060760 A1 | | 6/2010 | |
| FR | 2883941 A1 | | 10/2006 | |
| FR | 2911934 A1 | | 8/2008 | |
| WO | 2010032577 A1 | | 3/2010 | |

\* cited by examiner

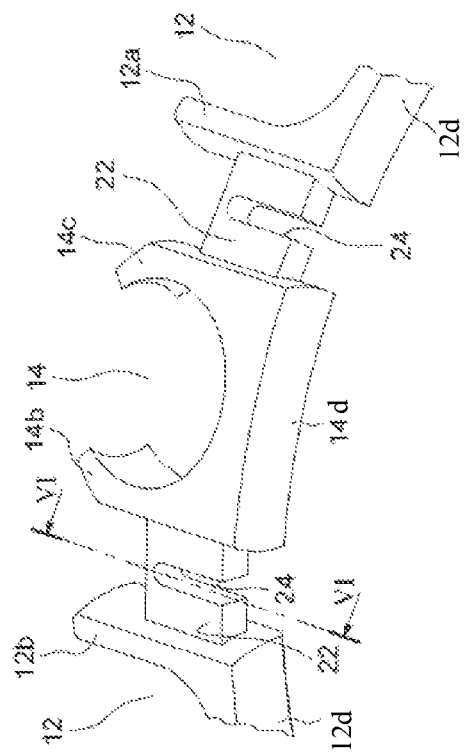
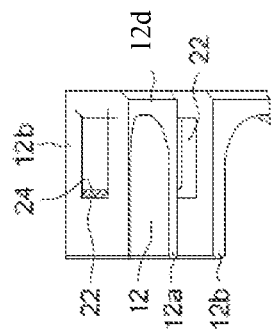
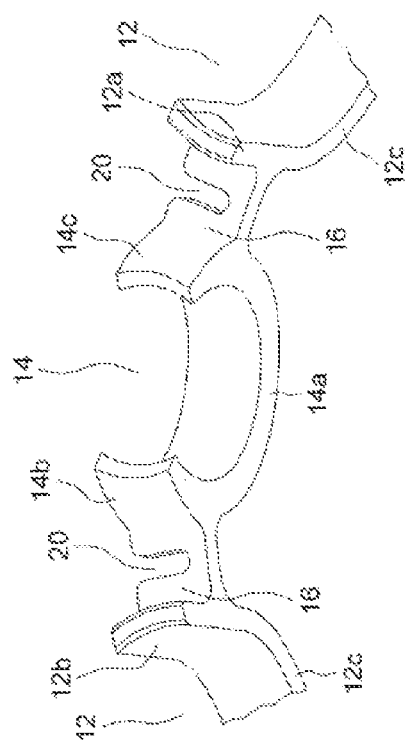

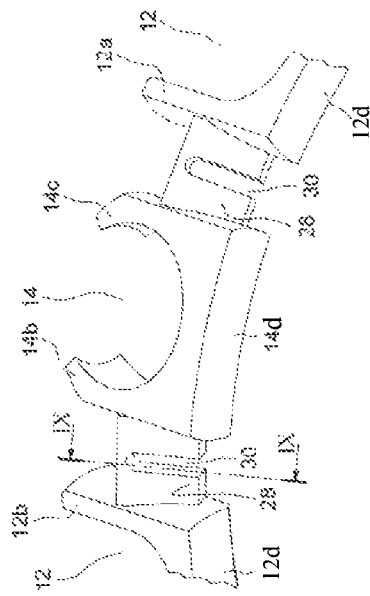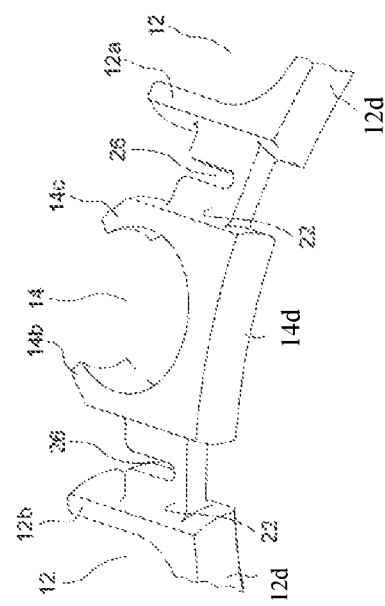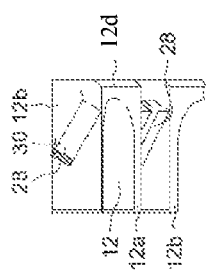

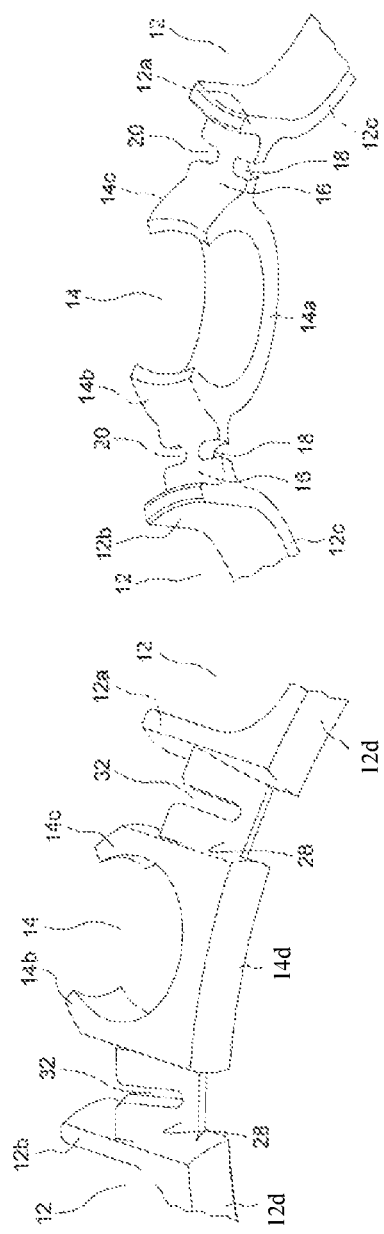

CAGE FOR A ROLLING BEARING, NOTABLY FOR A MOTOR VEHICLE ELECTRIC POWER STEERING BEARING

CROSS REFERENCE TO RELATED APPLICATIONS

This is a United States National Stage Application claiming the benefit of International Application Number PCT/EP2014/051284 filed on 23 Jan. 2014, which claims the benefit of French Application Serial Number 1350659, filed on 25 Jan. 2013, both of which are incorporated herein by reference in their entireties.

FIELD OF THE INVENTION

The present invention relates to the field of rolling bearings, notably the rolling bearings used in motor vehicle electric power steerings. More specifically, the invention relates to the retention cages which ensure a circumferential spacing between the rolling elements of the rolling bearings.

BACKGROUND OF THE PRESENT INVENTION

A motor vehicle electric power steering generally comprises an electromechanical actuator situated on the steering column or on the lower assembly which comprises mechanical components intended to ensure the angular positioning of the steered wheels of the vehicle. The electromechanical actuator comprises a rotary electric motor the shaft of which is supported in at least one rolling bearing, either directly or via a ball screw system. The rolling bearing generally comprises an inner ring, an outer ring, and a row of rolling elements, generally balls, arranged between the rings.

A retaining cage for a rolling bearing comprising a plurality of pockets to house the balls and each of which is defined in part by two claws arranged opposite a heel of the cage is known, from document FR-A1-2 911 934. Such cages are entirely satisfactory in many applications. However, in applications involving a low rotational speed or in applications in which the direction of rotation reverses sharply, this kind of cage runs into various difficulties. Specifically, under the effect of the balls, the cage may suffer extensive deformation and come into contact with the inner ring, causing it to become damaged or even destroyed.

In addition, when the direction in which the load is applied to the rolling bearing changes, as it does for example when the wheels of a vehicle equipped with an electric power steering system as described above are turned as the driver manoeuvres to the left and to the right when parking the vehicle, the cage is likewise severely deformed, or even destroyed.

A cage for a rolling bearing comprising first pockets provided with axial retention claws for the axial retention of the cage on the balls, and second pockets with no axial retention claws is also known, from document FR-A1-2 883 941.

In an application involving high axial and radial loads and low rotational speeds, for example speeds of between 100 and 300 rpm, the rolling bearing suffers extensive deformation. Such a cage does not offer the balls enough freedom relative to one another which means that the cage is also severely deformed if two adjacent balls move in opposite directions. This may cause the cage to be destroyed.

The present invention seeks to overcome these disadvantages.

SUMMARY OF THE PRESENT INVENTION

More specifically, the present invention seeks to provide a cage for a rolling bearing that offers good dependability.

The present invention also seeks to provide a cage that can be deformed with a limited risk of damage.

The present invention also seeks to provide a cage of small bulk, limited weight and that is easy to fit.

In one embodiment, the cage for a rolling bearing, which cage is intended to ensure the circumferential spacing of a row of rolling elements, comprises pockets for the rolling elements, and connecting tabs each connecting two successive pockets, at least one recess being formed in the thickness of at least one of the tabs.

The connecting tab may extend circumferentially between the two associated pockets. Advantageously, the connecting tab is axially offset towards the inside of the cage with respect to the open free ends of the pockets and is axially offset towards the outside with respect to the bottoms of the pockets.

The recess may extend in a first direction from one edge of the connecting tab towards an opposite edge so as to leave a zone of reduced thickness on the tab. The recess may open on each side of the connecting tab in a second direction distinct from the first direction.

In one embodiment, the recess extends radially and opens axially on each side of the connecting tab. The recess may be open radially on the inner side or on the outer side of the cage.

In another embodiment, the recess extends axially or obliquely and opens radially on each side of the connecting tab. The recess may be open axially on the same side as the pockets or on the opposite side to the pockets.

For preference, each of the connecting tabs comprises at least one recess formed in the thickness of the tab. Advantageously, each recess may form a slot.

In one embodiment, the cage comprises first pockets for first rolling elements of the row, which pockets are provided with axial retention means for the axial retention of the cage on the rolling elements, and second pockets for second rolling elements of the row, and which pockets have no axial retention means.

The cage may for example be made as a single piece from a synthetic material, preferably polymer material.

According to a second aspect, the invention relates to a rolling bearing comprising an outer ring, an inner ring, at least one row of rolling elements arranged between the rings, and a cage as defined hereinabove.

According to a third aspect, the invention relates to a motor vehicle electric power steering comprising at least one rolling bearing as defined hereinabove.

BRIEF DESCRIPTION OF THE DRAWINGS

The present invention will be better understood from reading the detailed description of some embodiments which are given by way of entirely nonlimiting examples and illustrated by the attached drawings in which:

FIG. 4 is a detailed view of a cage according to a second embodiment of the invention;

FIG. 5 is a detailed view of a cage according to a third embodiment of the invention;

FIG. 6 is a view in section on VI-VI of FIG. 5;

FIG. 7 is a detailed view of a cage according to a fourth embodiment of the invention;

FIG. 8 is a detailed view of a cage according to a fifth embodiment of the invention;

FIG. 9 is a view in section on IX-IX of FIG. 8;

FIG. 10 is a detailed view of a cage according to a sixth embodiment of the invention; and FIG. 11 is a detailed view of a cage according to a seventh embodiment of the invention.

DETAILED DESCRIPTION OF THE PRESENT INVENTION

Figure 1:
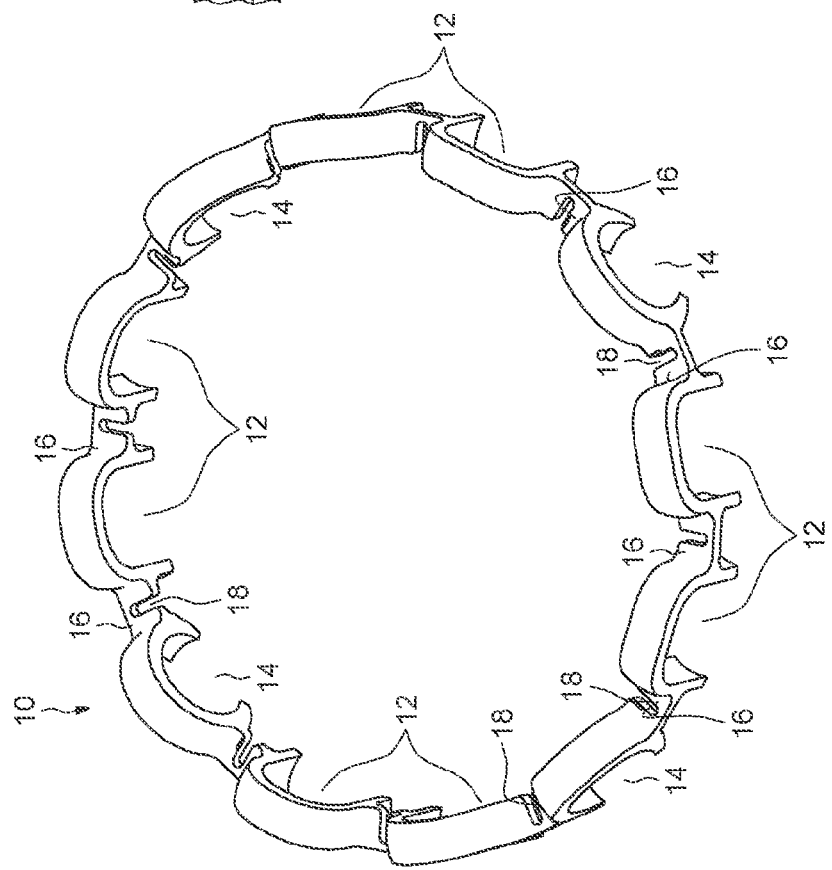
FIG. 1 is a perspective view of a rolling bearing cage according to a first embodiment of the invention.

FIG. 1 illustrates a cage 10 designed to be used in a rolling bearing of the type comprising an outer ring, an inner ring, and a plurality of rolling elements produced in the form of balls and mounted between the rings. The cage 10 makes it possible to maintain an even circumferential spacing of the balls between the rings. The cage 10 may advantageously be made as a single piece by moulding a polymer material, such as, for example, polyamide, notably PA 66 or PA 46, or alternatively a polyetheretherketone (PEEK).

The cage 10 of annular overall shape comprises a plurality of pockets 12, 14 which are evenly distributed in the circumferential direction and designed to accept the balls, and joining or connecting tabs 16 each connecting two successive pockets together. As will be described in greater detail later on, each connecting tab 16 is designed to allow relative movement between the two adjacent associated pockets.

Each pocket 12, 14 is open axially on just one side and open radially towards the inside and towards the outside so as to allow the cage 10 to be mounted and fitted over the balls. In the embodiment illustrated, the pockets 14 are provided with axial retention means for the axial retention of the cage on the balls as will be described hereinafter, and the pockets 12 have no such retention means. In this instance, there are eight pockets 12 arranged in pairs of immediately adjacent pockets. The pairs of pockets 12 are separated by a pocket 14. In this instance, there are four pockets 14 evenly distributed in the circumferential direction to ensure even axial retention of the cage 10 on the balls.

Figure 2:
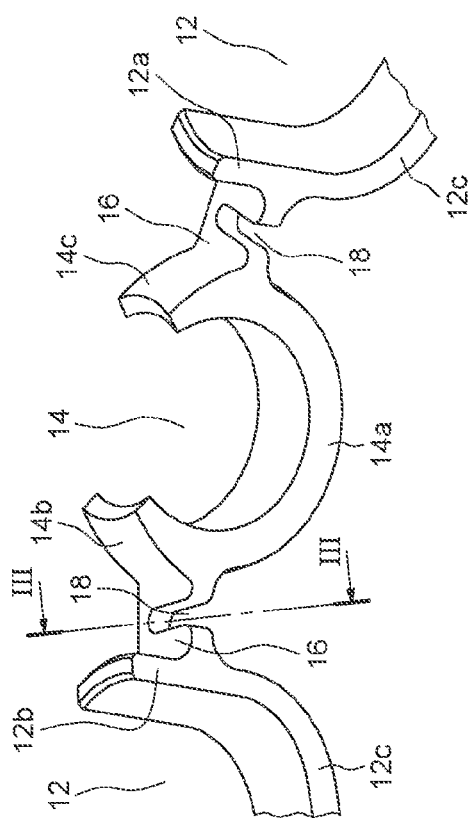
FIG. 2 is a detailed view of FIG. 1.
Figure 3:
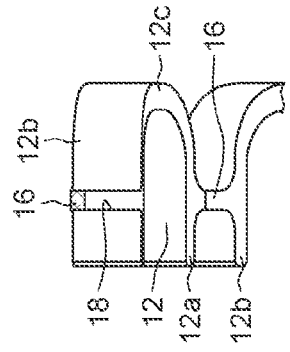
FIG. 3 is a view in section on of FIG. 2.

As illustrated more visibly in FIGS. 2 and 3, each pocket 12 comprises two substantially cylindrical lateral walls 12a, 12b spaced apart in the circumferential direction, and a bottom wall 12c connecting the lateral walls 12a, 12b. The walls 12a, 12b and 12c have a constant thickness. The diameter of the cylinder defining the lateral walls 12a, 12b of each pocket 12 is greater than that of the balls so that the balls can be offered some clearance in which to move radially and circumferentially with respect to the pockets 12. The lateral walls 12a, 12b are unable to ensure axial retention of the cage on the balls. The pockets 12 have no such axial retention means.

Each pocket 14 comprises a spherical wall 14a which tends to envelop the associated ball and forms a cup of constant thickness to accommodate the ball. Each pocket 14 also comprises two opposing claws 14b, 14c each extending one end of the spherical wall 14a. The claw 14b extends in the circumferential direction towards the opposite claw 14c to delimit the associated pocket 14. The free ends of the claws 14b, 14c are spaced apart by a distance that is smaller than the diameter of the balls. The claws 14b, 14c of a pocket are capable of axially retaining the cage 10 by clipping onto the ball arranged in the pocket.

The connecting tabs 16 are identical to one another and extend circumferentially between two adjacent pockets. In the embodiment illustrated, the tabs 16 extend also radially and have a reduced axial thickness by comparison with the axial dimension of the pockets 12, 14. Each tab 16 extends circumferentially from the wall of one of the two associated pockets and connects to the wall that is opposite it in the circumferential direction and belongs to the other pocket. Each tab 16 connects either a pocket 12 and a pocket 14, or two pockets 12. For each tab 16 connecting two pockets 12, the tab connects circumferentially on each side to the lateral wall 12a or 12b of the associated pocket on the opposite side to the opening provided for the ball. For each tab 16 connecting a pocket 12 and a pocket 14, the tab connects on the one hand to the lateral wall 12b of the pocket 12 and on the other hand to the spherical wall 14a of the pocket 14 that is circumferentially on the opposite side to the opening defined for each pocket.

Each tab 16 is situated axially between the bottom wall 12c and the free end of the lateral wall 12a or 12b of the associated pocket substantially mid-way between the free end and the bottom wall. In other words, each tab 16 is axially offset towards the inside with respect to the open free ends of the pockets 12, 14 and is axially offset towards the outside with respect to the bottoms of the pockets. Each tab 16 is delimited radially by an internal edge aligned with the bore of the cage and by an opposite external edge aligned with the exterior surface of the cage. Each tab 16 is flat.

Each tab 16 comprises a slot 18 extending radially from the internal edge of the tab towards the external edge. The slot 18 extends over most of the tab 16 up to the vicinity of the external edge so as to leave a zone of small radial thickness of material at the external edge. The slot 18 is open radially on the inner side and not open radially on the outer side. The slot 18 opens axially on each side of the tab 16. The slot 18 passes axially through the thickness of the tab 16. The slot 18 in the embodiment illustrated is U-shaped and is situated in an axial midplane of the tab.

In operation, if two balls housed in two adjacent pockets move in opposite directions, the tab 16 connecting the two pockets and comprising the slot 18 can flex elastically in the radial and/or axial direction to allow the balls and pockets a relative movement, and then return to its initial position when the balls are once again made to move the same way. In operation, the tabs 16 are therefore able to deform, and this greatly reduces the risk of damage to the cage 10. The small thickness of the tabs encourages this flexing or deformation. The slot 18 forms, on each tab 16, a zone in which the mechanical strength is locally weakened, further encouraging the tab to deform and the two associated pockets to move. Moreover, providing tabs 16 of small thickness and each comprising a slot 18 makes it easier to mount the cage over the balls by pushing axially. Specifically, the tabs 16 and the slots 18 allow the flexibility of the cage to be increased locally preventing cracks from appearing upon mounting. Furthermore, the slots 18 form recesses that lighten the cage 10 by reducing the amount of material used.

In the embodiment illustrated, the slots 18 of the tabs 16 are open radially on the inner side of the cage. As an alternative, as illustrated in the embodiment of FIG. 4 in which identical elements bear the same references, each tab 16 comprises a slot 20 that is open radially on the outer side of the cage and opens axially on each side through the thickness of the tab. Each slot 20 extending radially from the external edge of the tab up to the vicinity of the internal edge so as to leave a zone of small radial thickness of material, and opens axially on each side of the tab.

The embodiment illustrated in FIGS. 5 and 6, in which identical elements bear the same references, differs from the embodiments previously described in that the cage 10 comprises tabs 22 extending circumferentially and axially between two adjacent pockets. Each tab 22 extends circumferentially from the wall of one of the two associated pockets and connects to the wall that is opposite it in the circumferential direction and belongs to the other pocket circumferentially on the opposite side from the opening defined by each pocket. Each tab 22 has a reduced axial dimension by comparison with the axial dimension of the pockets 12, 14. Each tab 22 is axially offset towards the inside of the cage with respect to the open free ends of the pockets 12, 14 and is axially offset towards the outside with respect to the bottoms 12*d*, 14*d* of the pockets 12, 14. Each tab 22 also has a reduced radial thickness by comparison with the radial thickness of the pockets 12, 14. Each tab 22 is situated radially between the internal and external edges of the pockets 12, 14 and aligned respectively with the bore and on the exterior surface of the cage.

Each tab 22 comprises a slot 24 extending axially on the opposite side to the pockets 12, 14. Each slot 24 extends axially, from a radial end edge situated on the same side as the bottom of the pockets 12 and 14, towards the opposite radial end edge. The edges axially delimit the tab. The slot 24 extends over most of the tab 22. The slot 24 is open axially on the opposite side to the pockets 12, 14 and not open axially on the same side as the pockets. The slot 24 opens radially on each side of the tab 22. The slot 24 passes radially through the thickness of the tab 22. The slot 24 in this embodiment is U-shaped and is situated in an axial midplane of the tab.

In this embodiment illustrated, the slots 24 of the tabs 22 are open axially on the opposite side to the pockets 12, 14. As an alternative, as illustrated in the embodiment of FIG. 7, in which identical elements bear the same references, each tab 22 comprises a slot 26 open axially on the same side as the pockets 12, 14 and opening radially on each side through the thickness of the tab.

The embodiment illustrated in FIGS. 8 and 9, in which identical elements bear the same references, differs from the third embodiment only in that the cage comprises tabs 28 extending circumferentially and obliquely between two adjacent pockets. Each tab 28 extends obliquely towards the inside of the cage. Each tab 28 is situated radially between the internal and external edges of the pockets 12, 14 and aligned respectively with the bore and on the exterior surface of the cage. Each tab 28 is axially offset towards the inside of the cage with respect to the open free ends of the pockets 12, 14 and is axially offset towards the outside with respect to the bottoms 12*d*, 14*d* of the pockets 12, 14. A slot 30 is formed on each tab 28 in exactly the same way as the slots 24 of the tabs 22 of the third embodiment. In this embodiment, the slots 30 are open axially on the opposite side to the pockets 12, 14 and open radially on each side through the thickness of the tab. As an alternative, as illustrated in the embodiment of FIG. 10, in which identical elements bear the same references, each tab 28 comprises a slot 32 open axially on the side of the pockets 12, 14 and opening radially on the inner side and on the outer side of the cage.

In all of the embodiments illustrated, each tab comprises a single slot. As an alternative, it might be possible, for one or for each tab, to provide a high number of slots, for example two, so as to further increase the flexibility of the cage. Such slots may be formed from one and the same edge of the tab or alternatively from two opposite edges as has been illustrated in the embodiment of FIG. 11 which corresponds to the combination of the first and second embodiments. In this embodiment, the cage comprises, for each tab 16, the slot 18 extending from the internal edge of the tab and the slot 20 extending from the external edge. The slots 18, 20 are positioned facing one another here. Similarly, it might be possible to combine the slots of the third and fourth embodiments, or even the slots of the fifth and sixth embodiments.

In the embodiments illustrated, the slots form recesses in the tabs. Alternatively, it might be possible to provide other types of recesses, as a substitute or in a combination, for example notches, cutouts, etc. In another alternative form of embodiment it might also be possible to provide a cage comprising both tabs provided with recesses and tabs not provided with recesses.

In all of the embodiments illustrated, the tabs extend either radially or axially or obliquely. As an alternative, it might be possible to combine in one and the same cage the various tab orientations and the various orientations of the slots on the tabs.

In the embodiments illustrated, the cage comprises pockets provided with axial retention means and pockets which have no such retention means. As an alternative, the cage could comprise just one type of pocket. In another alternative form of embodiment it might even be possible to provide a cage that allows the circumferential spacing of other types of rolling elements, for example rollers.

By virtue of the invention, the pockets that house the rolling elements are able to move relative to one another in the radial and/or axial direction. Thus, the risk of the cage becoming damaged if two adjacent rolling elements move in opposite directions is greatly reduced insofar as these rolling elements are able to move relative to one another.

The invention claimed is:
1. A cage for a rolling bearing, the cage being adapted to ensure a circumferential spacing of a row of rolling elements, the cage comprising:
pockets for the row of rolling elements, each of the pockets comprising a base portion having first and second circumferential ends, a first portion extending from the first circumferential end, and a second portion extending from the second circumferential end, each of the first and second portions extending from the base portion in a first direction and forming a free end such that, with respect to the first direction, the base portion forms a first end of the cage and the free end forms a second end of the cage;
connecting tabs, each connecting tab connecting two successive pockets, wherein each connecting tab attaches to the first portion of a first of the two successive pockets and attaches to the second portion of a second of the two successive pockets, each connecting tab attaching to a location of the first and second portions that is between the free end of the first and second portions and the base portion such that the connecting tabs do not contact the free end or the base portion and that, with respect to the first direction, the connecting tabs are completely between the first and second ends of the cage, a first dimension of each of the connecting tabs as measured in a second direction, that is perpendicular to the first direction, being greater than a second dimension of each of the connecting tabs as measured in the first direction; and at least one recess being formed in the thickness of at least one of the tabs, the at least one recess extending in the second direction, and wherein a third dimension of the at least one recess as measured in the second direction is a recess maximum dimension.

2. The cage according to claim 1, wherein each connecting tab extends circumferentially between the two successive pockets.

3. The cage according to claim 1, wherein the connecting tabs are axially offset towards an inside of the cage with respect to the free ends of the first and second portions, and
wherein each connecting tab is axially offset towards an outside with respect to the base portion of the pockets.

4. The cage according to claim 1, the at least one recess extends in the second direction from one edge of the respective connecting tab towards an opposite edge so as to leave a zone of reduced thickness on the respective connecting tab.

5. The cage according to claim 4, wherein the at least one recess opens on each side of the connecting tab in the first direction.

6. The cage according to claim 5, wherein the at least one recess extends radially and opens axially on each side of the connecting tab.

7. The cage according to claim 5, wherein the at least one recess extends axially,
wherein the at least one recess opens radially on each side of the connecting tab.

8. The cage according to claim 1, each of the connecting tabs further comprising at least one recess formed in the thickness of each of the connecting tabs.

9. The cage according to claim 1, wherein the at least one recess forms a slot.

10. The cage according to claim 1, further comprising first pockets for first rolling elements of the row, wherein the first pockets are provided with an axial retention feature for axial retention of the cage on the first rolling elements, and second pockets for second rolling elements of the row, and wherein the second pockets have no axial retention feature.

11. A cage for a rolling bearing, the cage being adapted to ensure a circumferential spacing of a row of rolling elements, the cage comprising:
pockets for the row of rolling elements, each of the pockets comprising a base portion having first and second circumferential ends, a first portion extending from the first circumferential end, and a second portion extending from the second circumferential end, each of the first and second portions extending from the base portion in a first direction and forming a free end such that, with respect to the first direction, the base portion forms a first end of the cage and the free end forms a second end of the cage;
connecting tabs, each connecting tab connecting two successive pockets, wherein each connecting tab attaches to the first portion of a first of the two successive pockets and attaches to the second portion of a second of the two successive pockets, each connecting tab attaching to a location of the first and second portions that is between the free end of the first and second portions and the base portion such that the connecting tabs do not contact the free end or the base portion and that, with respect to the first direction, the connecting tabs are completely between the first and second ends of the cage, a first dimension of each of the connecting tabs as measured in a second direction, that extends obliquely to the first direction, being greater than a second dimension of each of the connecting tabs as measured in the first direction; and at least one recess being formed in the thickness of at least one of the tabs, the at least one recess extending in the second direction, and wherein a third dimension of the at least one recess as measured in the second direction is a recess maximum dimension.

12. A cage for a rolling bearing, the cage being adapted to ensure a circumferential spacing of a row of rolling elements, the cage comprising:
pockets for the row of rolling elements, each of the pockets comprising a base portion having first and second circumferential ends, a first portion extending from the first circumferential end, and a second portion extending from the second circumferential end, each of the first and second portions extending from the base portion in an axial direction and forming a free end such that, with respect to the axial direction, the base portion forms a first axial end of the cage and the free end forms a second axial end of the cage;
connecting tabs, each connecting tab connecting two successive pockets, wherein each connecting tab attaches to the first portion of a first of the two successive pockets and attaches to the second portion of a second of the two successive pockets, each connecting tab attaching to a location of the first and second portions that is between the free end of the first and second portions and the base portion such that the connecting tabs do not contact the free end or the base portion and that, with respect to the axial direction, the connecting tabs are completely between the first and second axial ends of the cage, a first radial dimension of each of the connecting tabs, as measured in a radial direction, being greater than an axial dimension of each of the connecting tabs; and at least one recess being formed in the thickness of at least one of the tabs, the at least one recess extending in the radial direction, and wherein a second radial dimension of the at least one recess as measured in the radial direction is a recess maximum dimension.

* * * * *